(12) United States Patent
Meckenstock et al.

(10) Patent No.: US 11,235,669 B2
(45) Date of Patent: Feb. 1, 2022

(54) HIGH VOLTAGE BATTERY FOR A MOTOR VEHICLE

(71) Applicant: FORD GLOBAL TECHNOLOGIES, LLC, Dearborn, MI (US)

(72) Inventors: Daniel Meckenstock, Wuppertal (DE); Joergen Hilmann, Leverkusen (DE); Marius Sawatzki, Pulheim (DE)

(73) Assignee: Ford Global Technologies, LLC, Dearborn, MI (US)

(*) Notice: Subject to any disclaimer, the term of this patent is extended or adjusted under 35 U.S.C. 154(b) by 122 days.

(21) Appl. No.: 16/377,401

(22) Filed: Apr. 8, 2019

(65) Prior Publication Data
US 2019/0315238 A1    Oct. 17, 2019

(30) Foreign Application Priority Data
Apr. 13, 2018   (DE) .......................... 102018205628.5

(51) Int. Cl.
*B60L 50/64*    (2019.01)
*H01R 13/44*    (2006.01)
(Continued)

(52) U.S. Cl.
CPC ............. *B60L 50/64* (2019.02); *H01M 50/20* (2021.01); *H01M 50/502* (2021.01);
(Continued)

(58) Field of Classification Search
CPC ..... B60L 50/64; H01M 2/1077; H01M 2/206; H01M 2220/20; H01M 50/333;
(Continued)

(56) References Cited

U.S. PATENT DOCUMENTS 5,360,307 A * 11/1994 Schemm ................. B60L 53/80
                                                              414/343
5,496,657 A *  3/1996 Dixon, Jr. ........... H01M 50/502
                                                               429/62
(Continued)

FOREIGN PATENT DOCUMENTS

DE    102013200930 A1 *  1/2013 .......... H01M 2/1077
DE    102013200930 A1      7/2014
(Continued)

OTHER PUBLICATIONS

Machine translation of DE102013017249A1 (Year: 2013).*

*Primary Examiner* — Eric R Smith
(74) *Attorney, Agent, or Firm* — David B. Kelley; Carlson, Gaskey & Olds, P.C.

(57) ABSTRACT

A high voltage battery has at least two battery modules that each have a module housing and an electrical connection element to electrically connect the battery modules. A battery module has a prestressing element which is arranged within the respective module housing and is connected to the respective electrical connection element. The electrical connection element connected to the prestressing element is arranged on the battery module such that it is movable between a connection position, in which the electrical connection element is guided through a through-hole in the module housing, and a protective position, in which the electrical connection element is arranged completely within the module housing. The prestressing element prestresses the electrical connection element in a direction of the protective position. The connection element in the connection position is connected to another battery module via at least one connecting unit. The connecting unit is configured such that the connection produced by the connecting unit can be released in a destruction-free manner or with destruction of the connecting unit by a movement of the mutually (Continued)

electrically connected battery modules relative to one another in a movement direction which extends transversely to a prestressing direction in which the connection element is prestressed by the prestressing element.

21 Claims, 2 Drawing Sheets

(51) Int. Cl.
    *H01R 13/631*    (2006.01)
    *H01M 50/20*     (2021.01)
    *H01M 50/502*    (2021.01)

(52) U.S. Cl.
    CPC ........... *H01R 13/44* (2013.01); *H01R 13/631* (2013.01); *H01M 2220/20* (2013.01)

(58) Field of Classification Search
    CPC ............ H01M 50/289; H01M 50/296; H01M 50/298; H01M 50/502; H01M 50/503; H01M 50/572–50/595; H01M 50/50–569
See application file for complete search history.

(56) References Cited

U.S. PATENT DOCUMENTS

| | | | |
|---|---|---|---|
| 9,260,027 B2 | 2/2016 | Kim | |
| 2010/0117591 A1* | 5/2010 | Thomas | H02J 7/0045 320/101 |
| 2012/0231318 A1* | 9/2012 | Buck | H01M 10/6555 429/120 |
| 2014/0342591 A1* | 11/2014 | Kim | B60L 53/80 439/159 |
| 2015/0099151 A1* | 4/2015 | Lavender | H01M 50/502 429/121 |
| 2015/0171410 A1* | 6/2015 | Shin | H01M 50/578 429/61 |
| 2015/0340669 A1* | 11/2015 | Aoki | H01M 2/1016 429/151 |
| 2018/0337384 A1* | 11/2018 | Volinski | H01M 50/502 |
| 2019/0044271 A1* | 2/2019 | Reedy | H01R 13/20 |

FOREIGN PATENT DOCUMENTS

| | | | |
|---|---|---|---|
| DE | 102013017249 A1 | 4/2015 | |
| DE | 102015220589 A1 * | 4/2017 | ......... H01M 50/502 |
| JP | 2007066855 A | 3/2007 | |

\* cited by examiner

HIGH VOLTAGE BATTERY FOR A MOTOR VEHICLE

CROSS-REFERENCE TO RELATED APPLICATIONS

This application is a U.S. non-provisional application claiming the benefit of German Patent Application No. 102018205628.5, filed on Apr. 13, 2018, which is incorporated herein by its entirety.

FIELD OF INVENTION

The disclosure relates to a high voltage battery for a motor vehicle having at least two mutually adjacently arranged battery modules, which each have a module housing for receiving battery cells and each have at least one electrical connection element for the electrical connection of the battery modules.

BACKGROUND OF THE INVENTION

A high voltage battery of a motor vehicle can be used, amongst other things, for supplying electrical energy to electrical drive devices of the motor vehicle. Such a high voltage battery conventionally has a plurality of battery modules which are electrically connected to one another. Each battery module has a module housing and a plurality of battery cells which are arranged in the module housing and electrically connected to one another. A high voltage battery must satisfy various safety requirements so that, in the event of an accident with a mechanical load effect on the high voltage battery accompanied by an at least partial destruction and/or deformation of the high voltage battery, electrical contact between battery modules and other electrically conductive components of the motor vehicle is prevented as reliably as possible.

DE 10 2013 017 249 A1 discloses a plug connector arrangement for the electrical coupling of battery modules which each have a battery module housing. At least two plug connectors are arranged at corners and/or edges of each battery module housing, wherein, in the case of adjacently arranged battery module housings, two plug connectors belonging to different battery modules are aligned parallel next to one another and can be electrically connected to one another by a connecting plug which can be attached to both plug connectors.

JP 2007 066 855 A discloses a safety plug for providing safety against discharge when the safety plug is released and for preventing unintentional reconnection. Upon disconnection of the plug from a socket, the plug connections disconnect from the contacts and, at the same time, a sealing body of a discharge coil covers the space between the plug connections and the contacts. As a result, the generation of an arc discharge linked to the disconnection of the plug connections from the contact, is suppressed. Even if an arc discharge occurs, sparks of the arc discharge are prevented from escaping outwards. Furthermore, after the plug has been released from the socket, owing to the presence of the sealing body between the connecting connections and the contacts, there is no possibility that the plug will lower under its own weight, whereby it is possible for the plug connections to touch the contacts, which means that unintentional reconnection can be reliably prevented.

US 2014/0342591 A1 discloses a device for attaching and detaching a connector for an electric vehicle with a replaceable battery. The device automatically connects and disconnects a connector to a battery and a connector to a vehicle when a battery is replaced. The device can have a connector housing, which is arranged on a battery assembly module for assembling and disconnecting the battery. A connecting element, which is connected to a cable on the vehicle, is movably arranged within the connector housing and is selectively connected to the connector on the battery. A movable element is arranged in the connector housing such that it is movable in line with the connecting element by a guide pin of the connector on the battery and an energy transmission element is connected to the connecting element and the movable element and moves the connecting element contrary to the movement direction of the movable element.

DE 10 2013 200 930 A1 discloses a device for the mechanical coupling of at least two mutually adjacently arranged accumulator modules of a modularly constructed accumulator. The device has at least one first connecting means arranged on one accumulator module and at least one further connecting means arranged on at least one further accumulator module, wherein the connecting means are designed and arranged on the accumulator modules in such a way that the first connecting means engages with positive locking in the further connecting means when the accumulator modules are arranged correctly.

SUMMARY OF THE INVENTION

The disclosure is based on the object of preventing an electrical connection between battery modules of the high voltage battery and other electrically conductive components of the motor vehicle in the event of an accident with a mechanical load effect on a high voltage battery of a motor vehicle.

A high voltage battery includes at least one battery module that has at least one prestressing element which is arranged within its module housing and is connected to its electrical connection element. The electrical connection element connected to the prestressing element is arranged on the battery module such that it is movable between a connection position, in which the electrical connection element is guided through a through-hole in the module housing and is arranged at least partially outside the module housing, and a protective position, in which the electrical connection element is arranged completely within the module housing. The prestressing element prestresses the electrical connection element in the direction of the protective position. The electrical connection element in its connection position is connected to another battery module via at least one connecting unit. The connecting unit is designed such that the connection produced by the connecting unit can be released in a destruction-free manner or with destruction of the connecting unit by a movement of the mutually electrically connected battery modules relative to one another in a movement direction which extends transversely to a prestressing direction in which the connection element is prestressed by the prestressing element.

It should be pointed out that, in the description below, individually described features and measures can be combined with one another in any technically useful manner and demonstrate further embodiments. The description additionally describes the disclosed embodiments, in particular, in conjunction with the figures.

According to one disclosed embodiment, the electrical connection elements of mutually adjacently arranged battery modules of the high voltage battery are connected to one another in a normal state of the high voltage battery so that the battery modules are electrically connected to one another via the connection elements. In this case, the electrical connection element which is prestressed in the direction of its protective position by the prestressing element is connected to the other battery module in each case by the connecting unit and is thus reliably held in its extended connection position.

In this case, a normal state of the high voltage battery refers to a state of the high voltage battery in which no mechanical loads, or only those generated by a collision-free driving operation of the motor vehicle, act on the high voltage battery. On the other hand, a collision state of the high voltage battery refers to a state of the high voltage battery in which, in the event of an accident involving the motor vehicle, collision-induced, and thus considerably greater, mechanical loads act on the high voltage battery and can lead to an at least partial destruction of and/or change in the shape of the high voltage battery.

The electrical connection element located in the connection position is physically and electrically connected to an electrical connection element of another battery module. In this case the electrical connection element which is displaceable can be designed as a plug or as a socket, whilst the electrical connection element of the other battery module can be designed as a socket or plug. Each electrical connection element can have a single-core, two-core or multi-core structure.

If such a collision state is present, it can result in a displacement or movement of the battery modules of the high voltage battery relative to one another. Since the connecting unit is designed in such a way that the connection, produced by the connecting unit, between the electrical connection element located in its connection position and the other battery module can be released in a destruction-free manner or with destruction of the connecting unit by a movement of the mutually electrically connected battery modules relative to one another in a movement direction which extends transversely to a prestressing direction in which the connection element is prestressed by the prestressing element. The connection between the connection element and the other battery module can be released in the collision state of the high voltage battery so that the electrical connection between the battery modules displaced relative to one another is broken.

According to one disclosed embodiment, this electrical disconnection of the battery modules is brought about in particular in that, after the release of the connection between the electrical connection element and the other battery module, the electrical connection element is moved from its contact position into its protective position by the prestressing element and is therefore arranged completely within the module housing of the battery module so that it cannot come into contact with another component of the high voltage battery and the motor vehicle. It is thus possible to reliably prevent a high voltage short circuit from being generated or a heavy current from flowing through an electrically conductive component of the motor vehicle.

Each electrical connection element can have a body made from an electrically insulating material in which at least one electrical line ends, which is connected for example to a contact element of the electrical connection element. Owing to the design of the electrical connection element with the electrically insulating body, the electrical connection element can be handled manually without thereby putting a person connecting electrical connection elements of the high voltage battery to one another at risk of receiving an electric shock. The electrical connection element can be linearly movably or pivotably arranged on the battery module.

The prestressing element can be connected indirectly or directly to the module housing of the battery module. The prestressing element exerts either a pressure force or a tensile force on the electrical connection element to prestress this in the direction of its protective position. The prestressing element can be produced partially or completely from a metallic material. The prestressing element can be electrically insulated with respect to the contact element connected thereto and/or with respect to a further component of the respective battery module.

The through-hole in the module housing of the respective battery module can have a shape adapted to the form of a cross-sectional area of a portion of the electrical connection element which is guided through the through-hole and can be designed to be a predetermined amount greater than the cross-sectional area of the portion of the electrical connection element.

The module housing of the respective battery module can be produced partially or completely from a metallic material, a plastics material, or a composite material and is preferably designed to be dimensionally stable. Each battery module can also have more than two battery cells arranged in the module housing, which can be lithium-ion battery cells, for example. Oppositely poled electrical connections of adjacent battery modules can be electrically connected to one another via the connection elements. Two or more inventive connection elements of a single battery module can also have a single inventive connecting unit in common or they can be jointly connected via this latter to the other battery module.

The high voltage battery can be, in particular, a traction battery of an electrically drivable motor vehicle, in particular an electric vehicle or a hybrid electric vehicle. The high voltage battery can also have more than two battery modules, which are electrically connected to one another in pairs. Each battery module can also be designed to have an electrical connection element which can be displaced accordingly between a protective position and a connection position so that, in the collision case of the high voltage battery, all connection elements are arranged protected within the battery module.

The disclosed embodiments can be combined with a conventional standard connection element without requiring relatively major structural changes. Sealing of the module housing can be realized by a combination of the disclosed embodiments with a conventional standard connection element. The disclosed embodiments enable robust, reliable and rapid electrical disconnection of battery modules in a collision case of the high voltage battery.

According to an advantageous embodiment, the connecting unit has at least one positive-locking element connected to the electrical connection element and at least one further positive-locking element connected to the other battery module, wherein the positive-locking elements can be connected to one another to form a connection in the form of positive locking between the electrical connection element and the other battery module, which positive locking can be released in a destruction-free manner. The positive locking between the positive-locking elements can be produced by forming at least one projection with an undercut on the one positive-locking element and configuring a portion of the other positive-locking element complementary thereto. The projection can have, for example, an at least partially rounded, for example circular or elliptical, and/or at least partially polygonal cross-sectional area, which is perpendicular to the movement direction which extends transversely to the prestressing direction in which the connection element is prestressed by the prestressing element. For example, a dovetail connection can be formed between the positive-locking elements to connect the contact elements to one another with positive locking. When assembling the high voltage battery, the individual battery modules can be electrically connected to one another in a simple manner without thereby requiring the actuation of, for example, a screw connection or the like to fasten electrical contact elements to one another. The electrical connection elements simply have to be connected to one another, in particular plugged into one another, and then the positive-locking elements are connected to one another with positive locking, which takes place via a movement of the battery modules relative to one another in the movement direction which extends transversely to the prestressing direction in which the connection element is prestressed by the prestressing element. The positive locking is preferably suitable for withstanding tensile loads in the direction of the prestressing direction and at the same time enabling simple release of the connection between the connection element and the other battery module with a slight application of force. The positive locking can be configured in such a way that it can be released by a relative movement between the positive-locking elements in two opposing directions. The positive-locking elements can be arranged radially outwardly with respect to the connection element in a partially or completely circumferential manner.

A further advantageous embodiment provides that the connecting unit has at least one coupling element, which is fastened to the other battery module and is designed in such a way that it is destroyed upon the release of the connection produced by the connecting unit. The coupling element can have at least one specified breaking point, for example. The coupling element can be materially bonded, for example, to a component connected to the electrical connection element and to the other battery module. The coupling element can be strong with respect to tensile loads, for example, but weak with respect to shear loads. This property can be generated, for example, via geometric shaping, for example a delicate trigger for shear loads, or via the use of a material which is fragile under a fast-acting mechanical load.

According to a further advantageous embodiment, the electrical connection element is connected to a connecting sleeve, which is arranged within the module housing and at a radial spacing from the electrical connection element and which is axially displaceably guided on a guide cylinder arranged in a stationary manner within the module housing between a first maximum position associated with the connection position of the electrical connection element and a second maximum position associated with the protective position of the electrical connection element, wherein the connecting sleeve connects the electrical connection element to the connecting unit. A reliable linear guidance of the electrical connection element is thus provided. The electrical connection element is indirectly connected to the connecting unit via the connecting sleeve. The connecting sleeve and/or the guide cylinder can be produced, for example, from an electrically insulating material. At least one opening can be arranged in the module housing, through which a portion of the connecting sleeve can be guided so that it can be connected to the connecting unit. The positive-locking element connected indirectly to the electrical connection element via the connecting sleeve can be realized by a corresponding configuration of that end portion of the connecting sleeve which faces the other battery module.

According to a further advantageous embodiment, the prestressing element is supported, on a first end, on a cylinder base of the guide cylinder which faces the through-hole and, on a second end, on a cylinder base of the connecting sleeve which is remote from the through-hole and connected to the electrical connection element. The prestressing element is thus arranged protected within the connecting sleeve and the guide cylinder to ensure the continued functioning of the disclosed embodiments.

A further advantageous embodiment provides that an internal diameter of the connecting sleeve is greater than an external diameter of the guide cylinder. A radially inwardly facing collar is arranged at least partially circumferentially on an end portion of the connecting sleeve which faces the through-hole, and this collar is guided on an outer lateral surface of the guide cylinder. A radially outwardly facing collar is arranged at least partially circumferentially on an end portion of the guide cylinder which is remote from the through-hole, and this collar is guided on an inner lateral surface of the connecting sleeve. An internal diameter of the collar arranged on the connecting sleeve is smaller than an external diameter of the collar arranged on the guide cylinder. The connecting sleeve and the guide cylinder are thus connected to one another in a captive manner. The maximum position of the connecting sleeve, which is associated with the protective position of the electrical connection element, is defined by an axial contact between the collars. Alternatively, an internal diameter of the guide cylinder can be greater than an external diameter of the connecting sleeve, wherein a radially outwardly facing collar can be arranged at least partially circumferentially on an end portion of the connecting sleeve which faces the through-hole, which collar is guided on an inner lateral surface of the guide cylinder, wherein a radially inwardly facing collar is at least partially circumferentially arranged on an end portion of the guide cylinder which is remote from the through-hole, which collar is guided on an outer lateral surface of the connecting sleeve. An external diameter of the collar arranged on the connecting sleeve can be greater than an internal diameter of the collar arranged on the guide cylinder.

According to a further embodiment, contact surfaces of mutually connected electrical connection elements are provided at least partially with a soft metallic coating. The soft metallic coating can be produced from copper, for example. By using the soft metallic coating for the mutual contacting of the electrical connection elements, it is possible to prevent a material bonding of the electrical connection elements resulting from a heating of the electrical connection elements, which can be generated by a relatively strong current flowing through the electrical connection elements during operation of the high voltage battery, in order to ensure the feasibility of the disclosed embodiments. The contact surfaces of the electrical connection elements can also each be provided completely with the soft metallic coating.

According to a further advantageous embodiment, at least one prestressing element is designed as a pressure spring or tension spring. The respective prestressing element designed as a pressure spring can be clamped, for example, between the base of the connecting sleeve, which is remote from the through-hole, and a cylinder base of the guide cylinder, which faces the through-hole. Alternatively, the respective prestressing element designed as a pressure spring can be clamped, for example, between the base of the connecting sleeve, which is remote from the through-hole, and the respective module housing. The respective prestressing element can be designed as a spiral spring here and can be arranged circumferentially on the electrical connection element.

BRIEF DESCRIPTION OF THE DRAWINGS

The various features and advantages of the disclosed examples will become apparent to those skilled in the art from the detailed description. The figures that accompany the detailed description can be briefly described as follows.

DETAILED DESCRIPTION

This disclosure relates to an assembly for a vehicle, in particular for a hybrid vehicle. The assembly has an electrical connection element that connects two battery modules in a connection position via at least one connecting unit, and the connecting unit is configured such that a connection produced by the connecting unit can be released in a destruction-free manner or with destruction of the connecting unit by a movement of the two battery modules relative to one another in a movement direction which extends transversely to a prestressing direction in which the electrical connection element is prestressed by the prestressing element.

The features and measures set out individually in the following description can be combined with each other in any technically advantageous manner to provide other embodiments of the present disclosure. In the different figures, identical parts are always provided with the same reference signs and are therefore generally also only described once.

Figure 1:
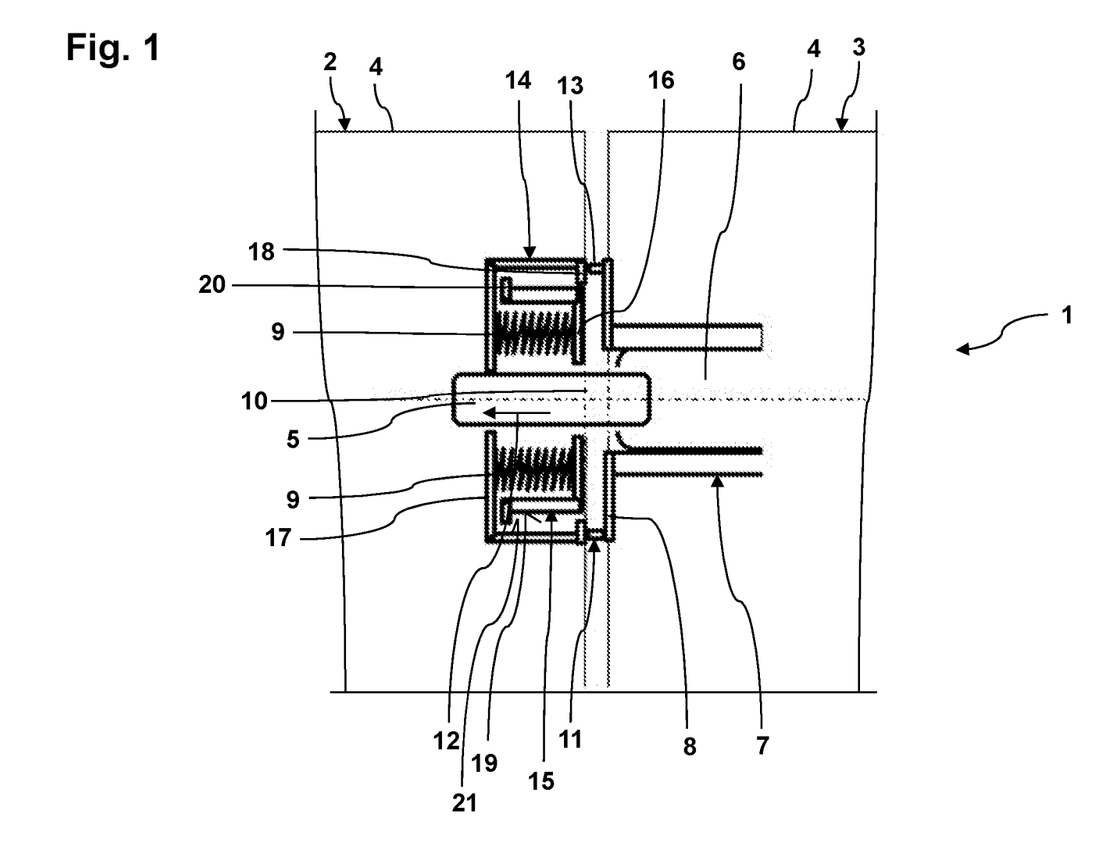
FIG. 1 illustrates a schematic illustration of an exemplary embodiment for a high voltage battery in a normal state.

FIG. 1 shows a schematic illustration of an exemplary embodiment for a disclosed high voltage battery 1 for a motor vehicle (not shown) in a normal state.

The high voltage battery 1 has two mutually adjacently arranged battery modules 2 and 3, which each have a module housing 4 for receiving battery cells (not shown) and each have at least one electrical connection element 5 or 6 for the electrical connection of the battery modules 2 and 3 to one another. The connection element 5 is designed as a plug and the connection element 6 is designed as a socket into which the connection element 5 is plugged. Each connection element 5 or 6 is electrically connected to at least one electrical line (not shown). The connection element 6 is arranged in a stationary manner within a holding element 7, which has a circumferential flange 8 via which the holding element 7 is fixed to the module housing 4 of the battery module 3. Contact surfaces (not shown) of the connection elements 5 and 6 can be provided at least partially with a soft metallic coating (not shown).

The battery module 2 has two prestressing elements 9, which are arranged within its module housing 4, are connected to its connection element 5, and are each designed as a pressure spring or spiral spring.

The connection element 5, which is connected to the prestressing elements 9, is arranged on the battery module 2 such that it is movable between a connection position (shown in FIG. 1), in which the connection element 5 is guided through a through-hole 10 in the module housing 4 and is arranged at least partially outside the module housing 4, and a protective position (shown in FIG. 2), in which the connection element 5 is arranged completely within the module housing 4. The prestressing elements 9 prestress the connection element 5 in the direction of the protective position.

Figure 2:
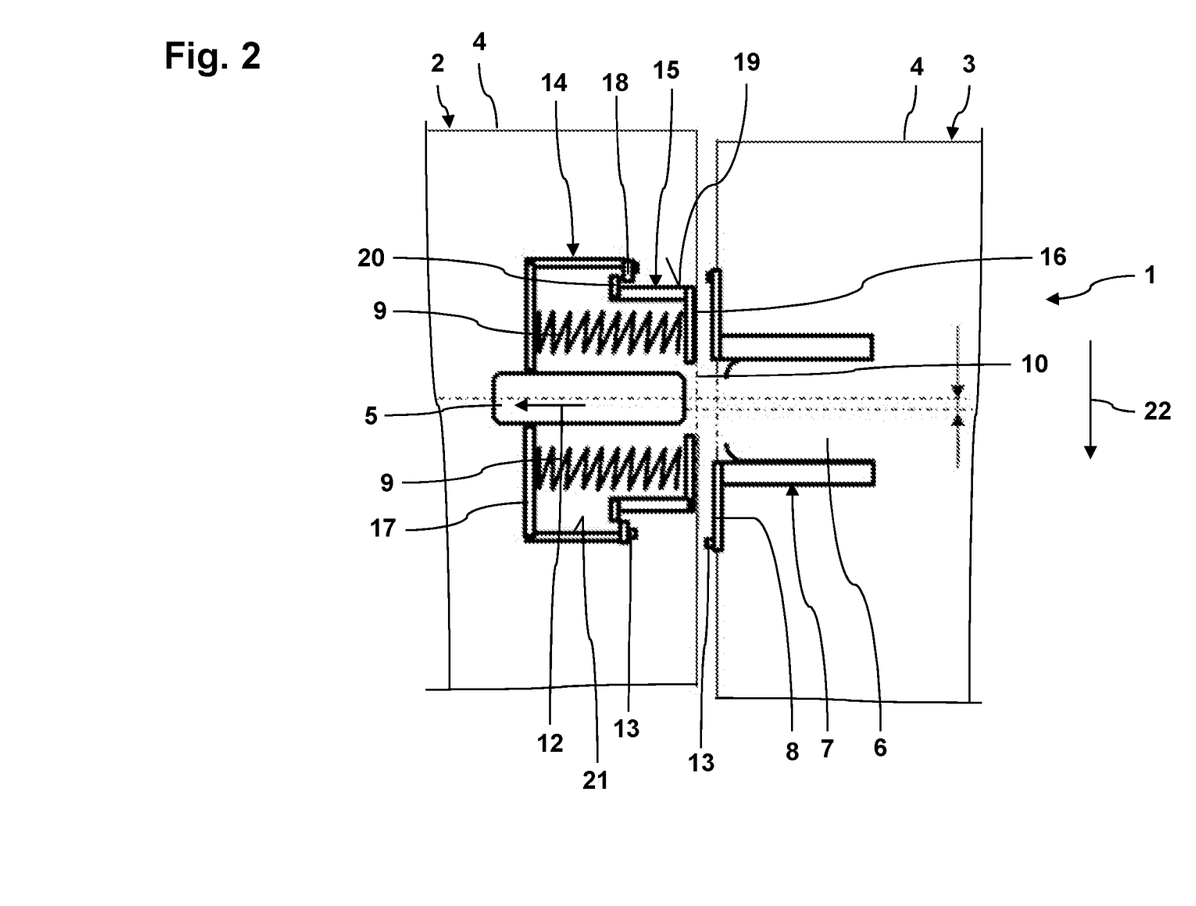
FIG. 2 illustrates a schematic illustration of the high voltage battery shown in FIG. 1 in a collision state.

The connection element 5 in its connection position is connected to another battery module 3 via a connecting unit 11. The connecting unit 11 is designed in such a way that the connection, produced by the connecting unit 11, between the connection element 5 and the other battery module 3 can be released with destruction of the connecting unit 11 by a movement of the mutually electrically connected battery modules 2 and 3 relative to one another in a movement direction which extends transversely to a prestressing direction (indicated by an arrow 12) in which the connection element 5 is prestressed by the prestressing elements 9. In particular, the connecting unit 11 has a coupling element 13 fastened to the other battery module 3, and the coupling element 13 is designed in such a way that it is destroyed upon the release of the connection produced by the connecting unit 11, as shown in FIG. 2.

Alternatively, the connecting unit 11 can have at least one positive-locking element (not shown) connected to the connection element 5 and at least one further positive-locking element (not shown) connected to the other battery module 3, wherein the positive-locking elements can be connected to one another to form a connection in the form of positive locking between the connection element 5 and the other battery module 3, which positive locking can be released in a destruction-free manner.

The connection element 5 is connected to a connecting sleeve 14, which is arranged within the module housing 4 and at a radial spacing from the connection element 5 and which is axially displaceably guided on a guide cylinder 15 arranged in a stationary manner within the module housing 4 between a first maximum position (shown in FIG. 1) associated with the connection position of the connection element 5 and a second maximum position (shown in FIG. 2) associated with the protective position of the connection element 5. The connecting sleeve 14 connects the connection element 5 to the connecting unit 11. In particular, the coupling element 13 is fastened on an end portion of the connecting sleeve 14 which faces the other battery module 3.

Each prestressing element 9 is supported, on the one hand, on a cylinder base 16 of the guide cylinder 15 which faces the through-hole 10 and, on the other, on a cylinder base 17 of the connecting sleeve 14 which is remote from the through-hole 10 and connected to the connection element 5.

An internal diameter of the connecting sleeve 14 is greater than an external diameter of the guide cylinder 15. A radially inwardly facing collar 18 is arranged at least partially circumferentially on an end portion of the connecting sleeve 14 which faces the through-hole 10, which collar is guided on an outer lateral surface 19 of the guide cylinder 15. A radially outwardly facing collar 20 is arranged at least partially circumferentially on an end portion of the guide cylinder 15 which is remote from the through-hole 10, which collar is guided on an inner lateral surface 21 of the connecting sleeve 14. An internal diameter of the collar 18 arranged on the connecting sleeve 14 is smaller than an external diameter of the collar 20 arranged on the guide cylinder 15.

FIG. 2 shows a schematic illustration of the high voltage battery 1 shown in FIG. 1 in a collision state. As a result of a collision of the motor vehicle, the battery module 3 has been displaced according to the arrow 22 relative to the battery module 2. The mutually electrically connected battery modules 2 and 3 here have been moved relative to one another in a movement direction which extends transversely to the prestressing direction (indicated by the arrow 12) in which the connection element 5 is prestressed by the prestressing elements 9. The coupling element 13 has thus been destroyed, whereby the connection between the connection element 5 and the other battery module 3 has been released with the destruction of the connecting unit 11. Following the release of the connection between the connection element 5 and the other battery module 3, the connection element 5 has been linearly moved by the prestressing elements 9 into the protective position shown, so that the connection element 5 is arranged completely within the respective module housing 4.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

The invention claimed is:

1. A high voltage battery for a motor vehicle comprising:
at least two battery modules arranged adjacently to each other, each battery module having a module housing to receive battery cells and at least one electrical connection element, wherein the at least one electrical connection element of one of the two battery modules is moveable within a respective module housing and wherein the at least one electrical connection element of the other of the two battery modules is fixed to a respective module housing such that the at least one electrical connection element of the one of the two battery modules is independently moveable relative to the at least one electrical connection element of the other of the two battery modules;
the one of the two battery modules has at least one prestressing element arranged within the respective module housing of the one of the two battery modules and connected to the at least one electrical connection element of the one of the two battery modules;
the at least one electrical connection of the one of the two battery modules is arranged on the one of the two battery modules such that the at least one electrical connection element of the one of the two battery modules is movable within the one of the two battery modules between a connection position, in which the at least one electrical connection element of the one of the two battery modules is guided through a through-hole in the respective module housing of the one of the two battery modules and is arranged at least partially outside the respective module housing of the one of the two battery modules, and a protective position where the at least one electrical connection element is arranged completely within the respective module housing of the one of the two battery modules;
the at least one prestressing element prestresses the at least one electrical connection element of the one of the two battery modules in a direction of the protective position;
the at least one electrical connection element of the one of the two battery modules in the connection position is connected to the other of the two battery modules via at least one connecting unit; and
the at least one connecting unit is configured such that a connection produced by the at least one connecting unit can be released in a destruction-free manner or with destruction of the at least one connecting unit by a movement of the two battery modules relative to one another in a movement direction which extends transversely to a prestressing direction in which the at least one electrical connection element of the one of the two battery modules is prestressed by the at least one prestressing element.

2. The high voltage battery as claimed in claim 1, wherein the at least one connecting unit has at least one positive-locking element connected to the at least one electrical connection element of the one of the two battery modules and at least one further positive-locking element connected to the other of the two battery modules, and wherein both positive-locking elements can be connected to one another to form a connection in the form of positive locking between the at least one electrical connection element of the one of the two battery modules and the other of the two battery modules, which positive locking can be released in a destruction-free manner.

3. The high voltage battery as claimed in claim 1, wherein the at least one connecting unit has at least one coupling element that is fastened to the other of the two battery modules and is configured to be destroyed upon release of the connection produced by the at least one connecting unit.

4. The high voltage battery as claimed in claim 1, wherein the at least one electrical connection element of the one of the two battery modules is connected to a connecting sleeve that is arranged within the respective module housing of the one of the two battery modules and is at a radial spacing from the at least one electrical connection element of the one of the two battery modules and which is axially guided on a guide cylinder arranged in a stationary manner within the respective module housing of the one of the two battery modules between a first maximum position associated with the connection position of the at least one electrical connection element of the one of the two battery modules and a second maximum position associated with the protective position of the at least one electrical connection element of the one of the two battery modules, and wherein the connecting sleeve connects the at least one electrical connection element of the one of the two battery modules to the at least one connecting unit.

5. The high-voltage battery as claimed in claim 4, wherein the at least one prestressing element is supported on a first end on a cylinder base of the guide cylinder which faces the through-hole and, on a second end, on a cylinder base of the connecting sleeve which is remote from the through-hole and connected to the at least one electrical connection element of the one of the two battery modules.

6. The high voltage battery as claimed in claim 4, wherein
an internal diameter of the connecting sleeve is greater than an external diameter of the guide cylinder,
a radially inwardly facing collar is arranged at least partially circumferentially on an end portion of the connecting sleeve which faces the through-hole, wherein the radially inwardly facing collar is guided on an outer lateral surface of the guide cylinder,
a radially outwardly facing collar is arranged at least partially circumferentially on an end portion of the guide cylinder which is remote from the through-hole, wherein the radially outwardly facing collar is guided on an inner lateral surface of the connecting sleeve, and
an internal diameter of the radially inwardly facing collar arranged on the connecting sleeve is smaller than an external diameter of the radially outwardly facing collar arranged on the guide cylinder.

7. The high voltage battery as claimed in claim 1, wherein contact surfaces of mutually connected electrical connection elements are provided at least partially with a soft metallic coating.

8. The high voltage battery as claimed in claim 1, wherein the at least one prestressing element is designed as a pressure spring or tension spring.

9. The high voltage battery as claimed in claim 1, wherein the at least one electrical connection element of the one of the two battery modules in the connection position is electrically connected to the at least one electrical connection element of the other of the two battery modules via the at least one connecting unit.

10. The high voltage battery as claimed in claim 1, wherein the at least one prestressing element comprises at least two prestressing elements arranged within the respective module housing of the one of the two battery modules and connected to the at least one electrical connection element of the one of the two battery modules.

11. The high voltage battery as claimed in claim 10, including a guide cylinder fixed within the respective module housing of the one of the two battery modules and a connecting sleeve that is connected to the at least one electrical connection element of the one of the two battery modules and is moveable along the guide cylinder in an axial direction between the connection position and the protective position, and wherein the connecting sleeve connects the at least one electrical connection element of the one of the two battery modules to the at least one connecting unit.

12. The high voltage battery as claimed in claim 11, wherein the at least one connecting unit includes a coupling element that is connected to the connecting sleeve and the other of the two battery modules when in the connection position, and wherein the coupling element is releaseable by the movement of the two battery modules relative to one another in the movement direction which extends transversely to the prestressing direction, which when released allows the at least one electrical connection element of the one of the two battery modules to move to the protected position via the at least two prestressing elements.

13. The high voltage battery as claimed in claim 12, wherein one of the at least two prestressing elements is positioned on one side of the at least one electrical connection element of the one of the two battery modules and the other of the at least two prestressing elements is positioned on an opposite side of the at least one electrical connection element of the one of the two battery modules, and wherein one end of each of the at least two prestressing elements is supported on a base of the guide cylinder and an opposite end of each of the at least two prestressing elements is supported on a base of the connecting sleeve.

14. The high voltage battery as claimed in claim 1, wherein the at least two battery modules comprise at least first and second battery modules, and wherein the first battery module comprises the at least one electrical connection element of the one of the two battery modules, the at least one electrical connection element of the one of the two battery modules directly facing the at least one electrical connection element of the other of the two battery modules, wherein the second battery module comprises the at least one electrical connection element of the other of the two battery modules, and wherein a distal end of the at least one electrical connection of the first battery module retracts outwardly from the respective module housing of the other of the two battery modules and is received completely within the respective module housing of the one of the two battery modules due to a force exerted by the at least one prestressing element when in the protective position.

15. A high voltage battery for a motor vehicle comprising:

at least two battery modules arranged adjacently to each other, each battery module having a module housing to receive battery cells and at least one electrical connection element, wherein the at least one electrical connection element of one of the two battery modules is moveable within a respective module housing and wherein the at least one electrical connection element of the other of the two battery modules is fixed to a respective module housing such that the at least one electrical connection element of the one of the two battery modules is independently moveable relative to the at least one electrical connection element of the other of the two battery modules;

the one of the two battery modules has at least one prestressing element arranged within the respective module housing of the one of the two battery modules and connected to the at least one electrical connection element of the one of the two battery modules;

the at least one electrical connection element of the one of the two battery modules is movable within the one of the two battery modules between a connection position, in which the at least one electrical connection element of the one of the two battery modules is guided through a through-hole in the respective module housing of the one of the two battery modules and is arranged at least partially outside the respective module housing of the one of the two battery modules to connect to the other of the two battery modules, and a protective position where the at least one electrical connection element of the one of the two battery modules is arranged completely within the respective module housing of the one of the two battery modules;

the at least one prestressing element prestresses the at least one electrical connection element of the one of the two battery modules in a prestressing direction toward the protective position;

the at least one electrical connection element of the one of the two battery modules in the connection position is electrically connected to the at least one electrical connection element of the other of the two battery modules via at least one connecting unit; and the at least one connecting unit is configured such that a connection produced by the at least one connecting unit can be released in a destruction-free manner or with destruction of the at least one connecting unit by a movement of the two battery modules relative to one another in a movement direction which extends transversely to the prestressing direction.

16. The high voltage battery as claimed in claim 15, including a guide cylinder fixed within the respective module housing of the one of the two battery modules and a connecting sleeve that is connected to the at least one electrical connection element of the one of the two battery modules and is moveable along the guide cylinder in an axial direction between the connection position and the protective position, the axial direction being common with the prestressing direction, and wherein the connecting sleeve connects the at least one electrical connection element of the one of the two battery modules to the at least one connecting unit.

17. The high voltage battery as claimed in claim 16, wherein the at least one connecting unit includes a coupling element that is connected to the connecting sleeve and the other of the two battery modules when in the connection position, and wherein the coupling element is releaseable by the movement of the two battery modules relative to one another in the movement direction to allow the at least one electrical connection element of the one of the two battery modules to move to the protected position.

18. The high voltage battery as claimed in claim 16, wherein the at least one prestressing element comprises at least two prestressing elements arranged within the respective module housing of the one of the two battery modules and connected to the at least one electrical connection element of the one of the two battery modules.

19. The high voltage battery as claimed in claim 18, wherein one of the at least two prestressing elements is positioned on one side of the at least one electrical connection element of the one of the two battery modules and the other of the at least two prestressing elements is positioned on an opposite side of the at least one electrical connection element of the one of the two battery modules, and wherein one end of each of the at least two prestressing elements is supported on a base of the guide cylinder and an opposite end of each of the at least two prestressing elements is supported on a base of the connecting sleeve.

20. The high voltage battery as claimed in claim 16, wherein an internal diameter of the connecting sleeve is greater than an external diameter of the guide cylinder.

21. The high voltage battery as claimed in claim 15, wherein the at least two battery modules comprise at least first and second battery modules, and wherein the first battery module comprises the at least one electrical connection element of the one of the two battery modules, the at least one electrical connection element of the one of the two battery modules directly facing the at least one electrical connection element of the other of the two battery modules, wherein the second battery module comprises the at least one electrical connection element of the other of the two battery modules, and wherein a distal end of the at least one electrical connection of the first battery module retracts outwardly from the respective module housing of the other of the two battery modules and is received completely within the respective module housing of the one of the two battery modules due to a force exerted by the at least one prestressing element when in the protective position.

\* \* \* \* \*